(No Model.)
G. G. LEE.
FARM GATE.
No. 367,415. Patented Aug. 2, 1887.
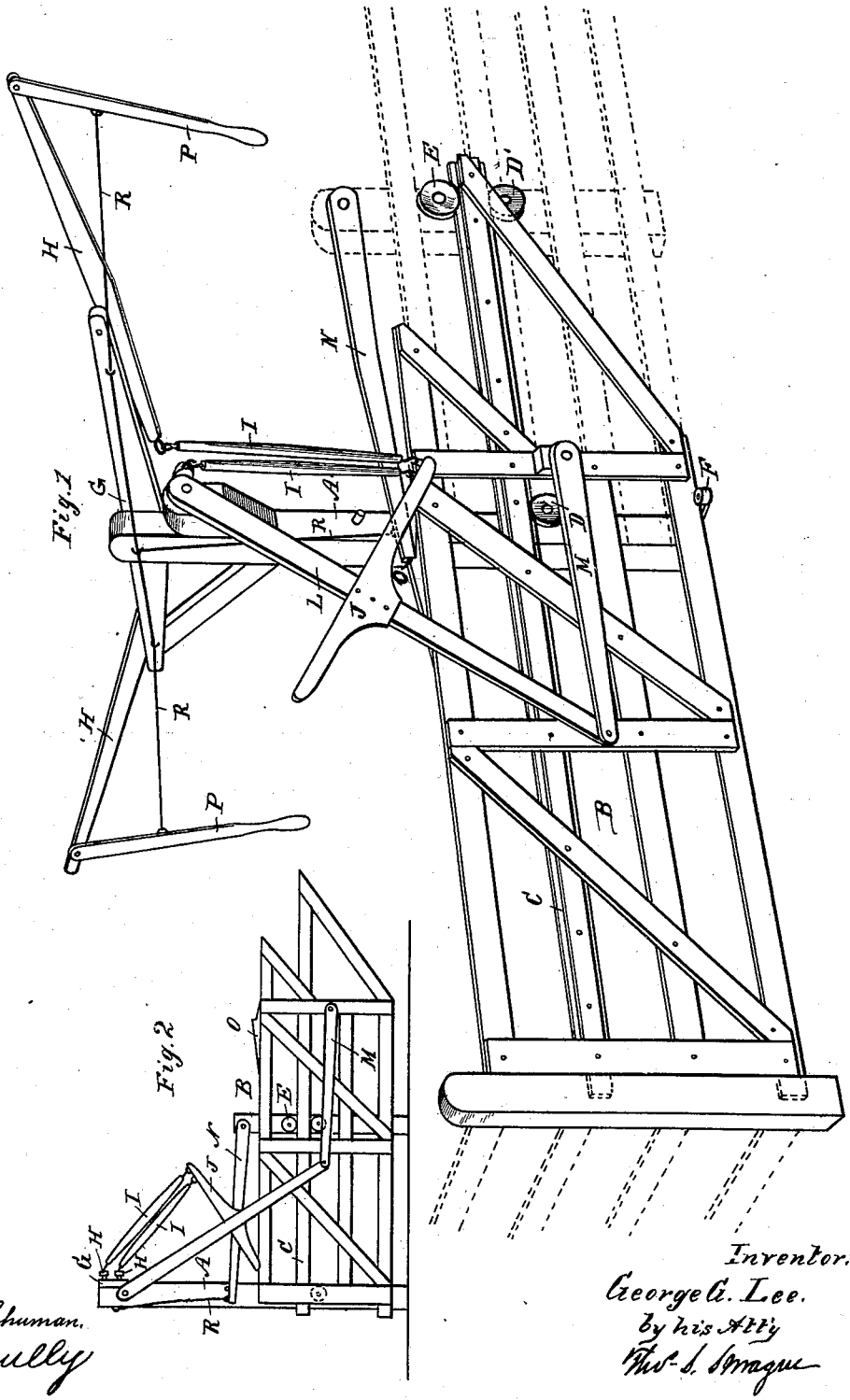
Attest:
John Schuman.
E. Scully
Inventor:
George G. Lee.
by his Atty
Thos. S. Sprague

UNITED STATES PATENT OFFICE.

GEORGE G. LEE, OF PAW PAW, MICHIGAN.

FARM-GATE.

SPECIFICATION forming part of Letters Patent No. 367,415, dated August 2, 1887.

Application filed December 23, 1886. Serial No. 222,406. (No model.)

*To all whom it may concern:*

Be it known that I, GEORGE G. LEE, of Paw Paw, in the county of Van Buren and State of Michigan, have invented new and useful Improvements in Farm-Gates; and I do hereby declare that the following is a full, clear, and exact description thereof, reference being had to the accompanying drawings, which form a part of this specification.

This invention relates to certain new and useful improvements in sliding gates of that class in which the gate is designed to be opened or closed in passing through without alighting from the vehicle; and the invention consists in the peculiar construction, arrangement, and combination of the parts, all as more fully hereinafter set forth.

Figure 1 is a perspective view of my improved gate closed. Fig. 2 is an elevation of the gate open.

In the accompanying drawings, which form a part of this specification, A represents the main gate-post, to which are secured the levers for operating the gate B. To one of the longitudinal bars of the gate B is secured a running or guide bar, C, the lower edge of which rests upon the flanged rollers D D', the upper edge of said guide-bar being overlapped by the flanged roller E, said rollers E and D' being secured to the same post and sufficiently close together to prevent the tipping of the gate, and yet allow of a free reciprocation or running of the guide-bar between them. To prevent an outward swinging at the bottom of the gate, a friction-roller, F, is employed, as shown. To or near the top of the post A is rigidly secured a transverse bar, G, to the outer ends of which are fulcrumed the levers H, the inner ends of which are connected by connecting-rods I to one end of a cross head or bar, J, secured to a lever, L, the upper end of which is pivotally secured to the side of the post A, while its lower end is pivotally secured to one end of a lever, M, the opposite end of which is similarly secured to the gate B, as shown.

By this construction and arrangement of levers connected with the gate it can readily be seen that (supposing the gate to be closed) by drawing down upon the outer end of either one of the levers H the system of levers will be compelled to assume the position shown in Fig. 2, and necessarily cause the gate to slide rearward, disclosing the gate-opening, and by a reverse movement of the levers the gate will be closed.

To lock the gate in its closed position, I pivotally secure a gravity-latch, N, to one of the posts of the fence, the free end of such latch resting upon the top rail or bar of the gate, and as such gate is closed it drops behind the stop O, which is secured to the gate. To the outer ends of the levers H are pivotally secured the hanging levers P, which are connected by means of a cord or cable, R, to the free end of the latch; and it will be seen that by drawing outward slightly upon the lower end of one of these levers P the latch will be disengaged from its stop on the gate, when the latter is free to be opened, as hereinbefore described.

A gate constructed to be operated substantially as shown can readily be opened or closed from a wagon or a load without the necessity of the driver's dismounting, while the team can be driven close up to the gate, as no allowance has to be made for the swinging thereof, and it will be found extremely handy in the separating of stock, as it can be operated so easily and quickly.

I am aware of the Patents Nos. 307,997, 310,006, and 327,992, and make no claim to the construction shown therein as forming part of my invention.

What I claim as my invention is—

The combination, with the post A, gate B, guide-bar C, rollers D D' E F, and the bar G, rigidly secured to the upper end of said post, of the levers H, fulcrumed on said bar, lever L, pivoted at one end on said post, lever M, pivoted at one end to the gate and at the other end to said lever L, cross-head J on said lever L, rods I, connecting the levers H and cross-head, handles P, pivoted to the free ends of the lever H, latch N, and the cords connecting said latch and handles, substantially as described.

GEORGE G. LEE.

Witnesses:
H. S. SPRAGUE,
E. SCULLY.